United States Patent [19]

Righetti

[11] 4,347,143

[45] Aug. 31, 1982

[54] APPARATUS AND PROCESS FOR PURIFYING POLLUTED WATER CONTAINED IN NATURAL OR ARTIFICIAL POOLS BY DIRECT INJECTION OF OXYGEN

[76] Inventor: Gianmaria Righetti, Via Losanna 29, Milano, Italy

[21] Appl. No.: 740,068

[22] Filed: Nov. 8, 1976

[30] Foreign Application Priority Data

Nov. 11, 1975 [IT] Italy ............................... 29164 A/75
Sep. 10, 1976 [IT] Italy ............................... 27088 A/76

[51] Int. Cl.³ .............................................. C02F 1/72
[52] U.S. Cl. ................................... 210/758; 210/188; 210/194; 210/242.2; 261/121 R
[58] Field of Search .................... 210/3, 15, 170, 194, 210/188, 620, 603, 621, 750, 758, 218, 242.2; 261/77, 119 R, 121 R

[56] References Cited

U.S. PATENT DOCUMENTS

| | | | |
|---|---|---|---|
| 3,271,304 | 9/1966 | Valdespino et al. | 210/194 |
| 3,772,188 | 11/1973 | Edwards | 210/15 |
| 3,794,303 | 2/1974 | Hirshon | 261/77 X |
| 3,872,003 | 3/1975 | Walker | 210/15 |
| 4,009,098 | 2/1977 | Jeris | 210/3 |
| 4,060,574 | 11/1977 | Verner et al. | 261/77 |

*Primary Examiner*—Thomas G. Wyse
*Attorney, Agent, or Firm*—Browdy and Neimark

[57] ABSTRACT

A process and apparatus for purifying polluted natural and artificial water pools by directly injecting pressurized oxygen into the deep layers of the pool water and recovering the undissolved oxygen, not used up by the pollutants, for recycle and reuse in the process by means of a collector device.

11 Claims, 7 Drawing Figures

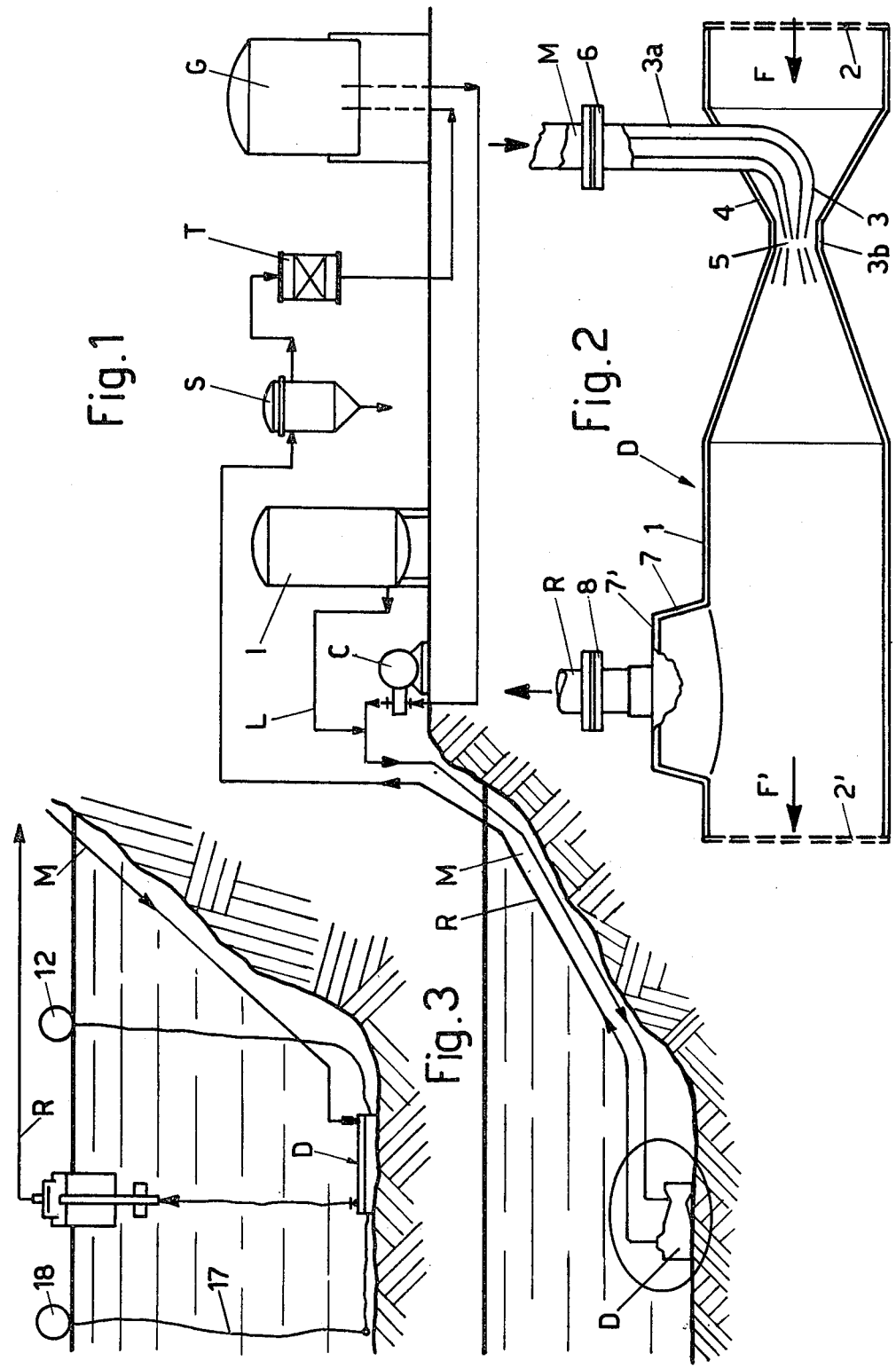

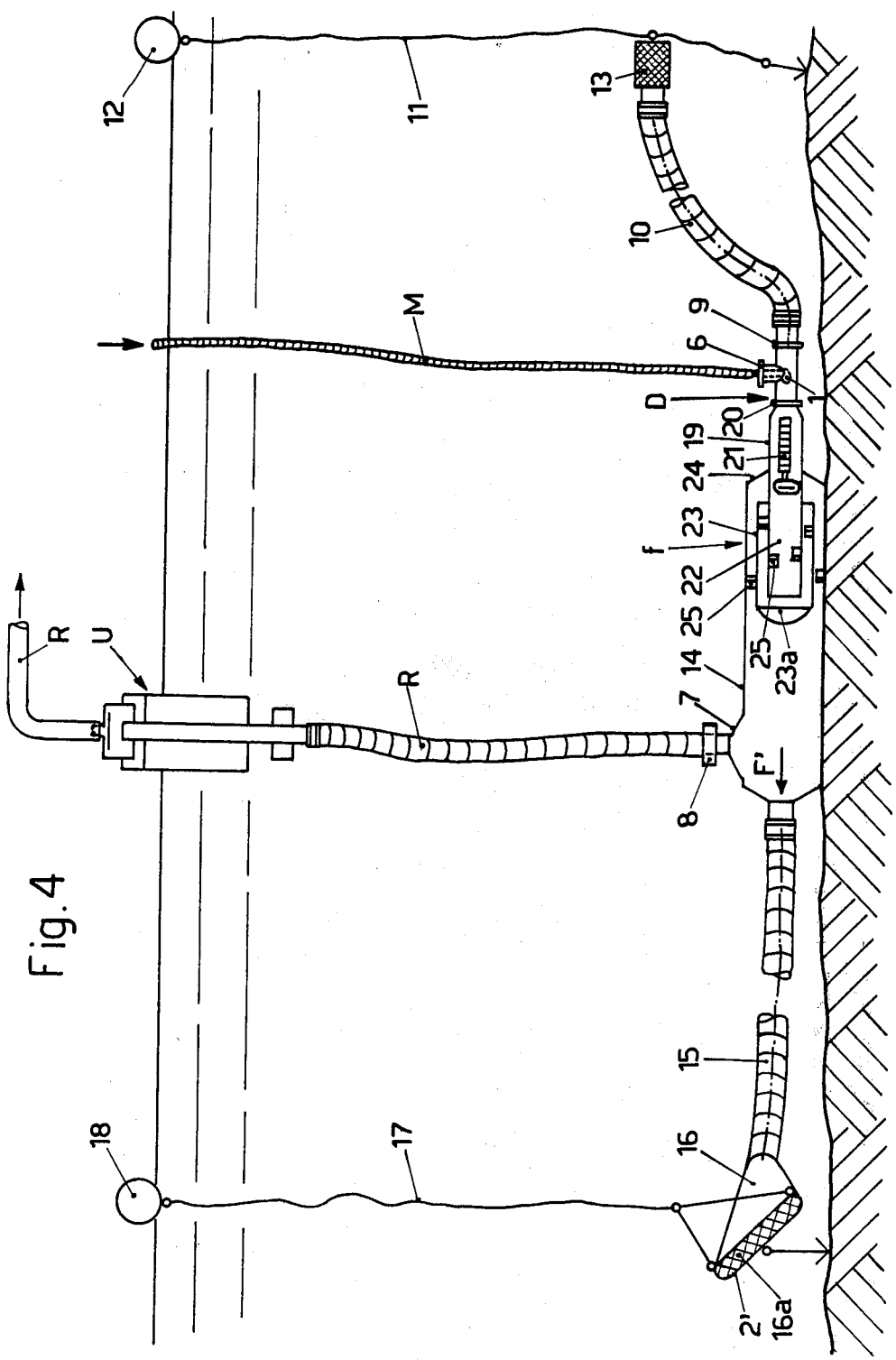

APPARATUS AND PROCESS FOR PURIFYING POLLUTED WATER CONTAINED IN NATURAL OR ARTIFICIAL POOLS BY DIRECT INJECTION OF OXYGEN

FIELD OF THE INVENTION

The present invention relates to an apparatus and a process for purifying polluted water contained in natural or artificial pools by direct injection of oxygen into the pool itself. More particularly, the present invention relates to an oxygen injector to be used in the above-mentioned apparatus, which comprises means for carrying out the recovery of the oxygen which has not been used up in the water purification.

BACKGROUND OF THE INVENTION

In the field of the apparatuses devised for counteracting pollution in large water masses contained in natural pools there are at present used devices termed oxygenators which by pumping bring about the mixing of water with air. These devices can consist of floating turbine pumps which suck water and eject it again into the pool, thus facilitating restoration of equilibrium conditions between the atmospheric oxygen and the oxygen dissolved in the water. However, these devices have proved to be of limited usefulness insofar as they facilitate oxygen diffusion in the superficial water layers only, whilst this diffusion process is not suitable to involve the deeper water layers. There are known other devices acting in the deep water layers (for instance: bubble guns, Limno oxygenators and the like), however, their action is confined to limited pool zones; moreover, they either do not provide for the use of oxygen or do not provide for the undissolved oxygen recovery when this gas is used.

SUMMARY OF THE INVENTION

The subject matter of the present invention is therefore a process and an apparatus for carrying out oxygenation of the deep water layers in large natural or artificial pools, with a view to favoring throughout the pool mass the setting of conditions which ultimately bring about that the aerobic metabolic processes prevail over the anaerobic ones, however without modifying the thermal stratification of the pool, thus preserving the natural limnological strata.

The apparatus according to the present invention comprises an oxygen injector particularly suited to operate deeply in natural or artificial pools. This injector is provided with means suitable to carry out substantially the overall recovery of that portion of oxygen which, after injection, has not dissolved in the water.

The apparatus for purifying polluted water contained in natural or artificial pools according to the present invention, comprising an oxygen injector selected from porous plates and candles, ejectors, blowers and the like, is to this end characterized by a collector device for collecting unconsumed oxygen, means being provided between the oxygen injector and the collector device for substantially avoiding any dispersion of the injected unconsumed oxygen, with a view to permitting recovery and reuse thereof. This apparatus shall be advantageously used in a plant for purifying polluted water comprising in combination:

(a) a unit for producing oxygen or an oxygen reservoir having proper capacity;

(b) a unit for compressing oxygen to a pressure higher than the hydrostatic pressure acting at the pool level at which injection is carried out;

(c) an oxygen injection unit suitable to operate at the hydrostatic pressure acting at the bottom level of the pool;

(d) delivery means for conveying oxygen from the oxygen production unit or reservoir to the injection unit;

(e) collecting means for recoverying the oxygen injected into the pool water and unconsumed therein, before the oxygen passes through the upper layers and disperses in the atmosphere; and (f) means for recycling the recovered oxygen to the oxygen compressing unit.

According to one embodiment thereof, the apparatus also comprises, in operative combination with the oxygen injector, means for carrying out forced mixing of water with oxygen, whilst maintaining the mixture under turbulent flow conditions for the time period necessary to permit dissolution of most of gas bubbles.

According to another aspect thereof, the present invention relates to a process for purifying polluted water contained in natural or artificial pools, comprising directly injecting oxygen into the pool water, characterized by injecting oxygen into the deep zones of the pool and substantially recovering the unconsumed oxygen. More specifically, the process according to the present invention comprises the following steps:

compressing oxygen to a pressure at least equal to the hydrostatic pressure acting at the pool level at which oxygen injection is carried out plus the pressure necessary to actuate the injection means;

conveying said pressurized oxygen as far as the desired depth of the pool;

carrying out the oxygen injection at the above-mentioned level;

thoroughly mixing oxygen with water and maintaining the mixture under turbulent flow conditions over a time period sufficient to achieve a high dissolution efficiency;

providing means for recovering the injected, undissolved oxygen; and conveying the oxygen to the pool surface with a view to bringing about oxygen recompression and recycle.

It will be apparent to those skilled in this art that the term "oxygen" is not meant to encompass exclusively pure oxygen, but also any gaseous mixture comprising oxygen as the main constituent.

The oxygen injector can be selected among those of conventional construction (such as turbine injectors, scrubbers, porous plates, ejectors and the like) depending on pool location, prevailing streams, pool shape and the like. According a preferred, however non-limiting, embodiment of the apparatus according to the present invention, the injection device consists of an ejector.

Regardless of the injection device actually used, it is essential in order to achieve the objects of the present invention that the injection device be provided with means for recovering oxygen, which means comprises a bell-shaped collector placed on the path of the water leaving the injection device. It is necessary that, between the injection device and the collector device, means be provided for avoiding dispersion of the injected and unconsumed oxygen. For instance, in case the injection is carried out by the ejector which will be illustrated in detail below, such means simply consists of the continuous tubular wall of a Venturi-shaped pipe.

It should be noted that, whilst according to the embodiment which will be illustrated below, the injection device is provided with its own collector, a single collector structure suitably sized shall be able to recover the unconsumed oxygen delivered by a number of injection devices forming for instance a group made up of six devices arranged side by side to each other and operatively connected to a single centrally-positioned collector. The suitable collector size as a function of the number and construction of the injection devices as well as the opportunity of different arrangements of the injection devices with respect to the collector will be apparent to those skilled in this art, upon reading of the teachings of this invention.

According to a further object of this invention, the means for conveying the recovered oxygen to the production unit can be provided with a drop trap. In this way, it shall be possible to separate from oxygen any water trace, still present therein.

BRIEF DESCRIPTION OF THE DRAWINGS

The apparatus and process for purifying polluted water contained in natural or artificial pools in accordance with the present invention will be now illustrated in detail with reference to the annexed drawings, wherein:

FIG. 1 is a schematic view of a purification plant provided with the apparatus according to the present invention;

FIG. 2 shows a practical embodiment of the device for injecting and recovering oxygen according to the present invention;

FIG. 3 is a schematic view showing a different embodiment of the apparatus according to the present invention;

FIG. 4 shows in detail the embodiment illustrated in FIG. 3;

DESCRIPTION OF THE PREFERRED EMBODIMENTS

Figure 5:
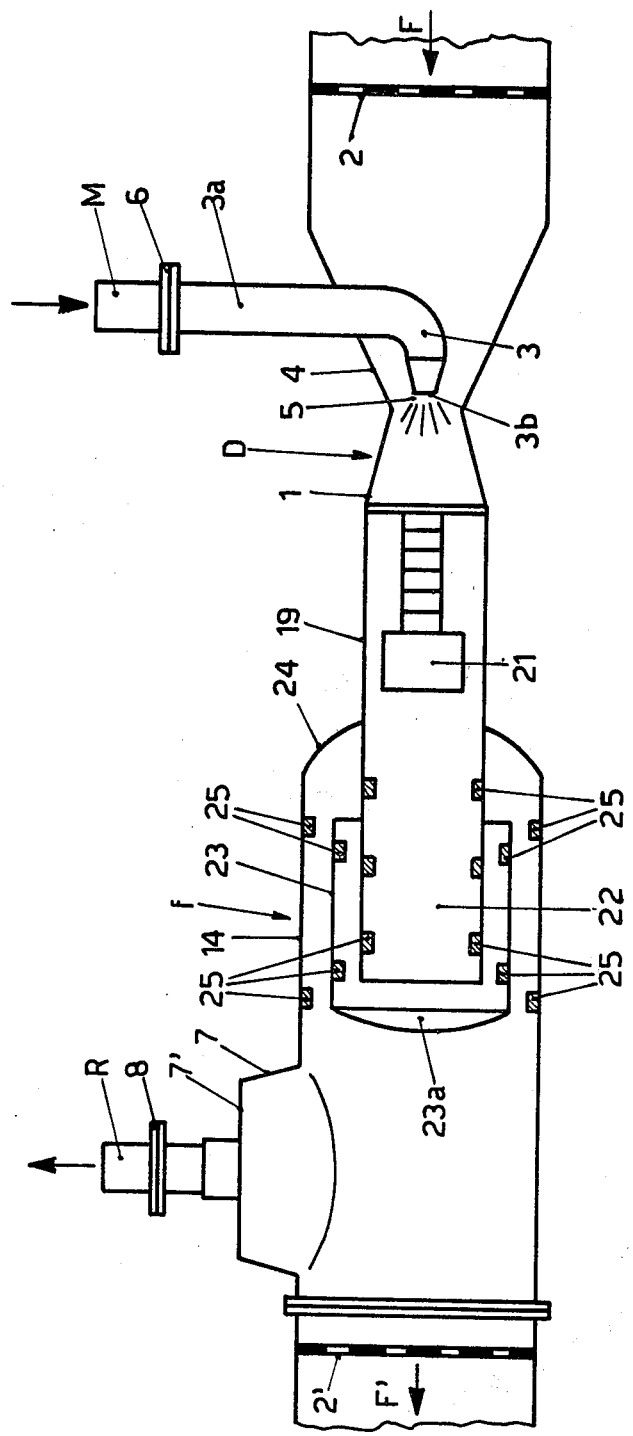
FIG. 5 is a detailed illustration of the means for carrying out forced mixing of water with oxygen.

With specific reference to FIG. 1, the purification plant comprises a gasometer G for storing raw oxygen, which feeds a compressor C which is connected via a delivery pipe M to an injection device D. If a reservoir of liquid oxygen under pressure would substitute, as it frequently happens at present, for the gasometer, the oxygen-containing gas could be sent to the delivery side and not to the suction side of the compressor.

Feeding of the injection device D is carried out not only with the recycle oxygen but also with fresh oxygen coming from a reservoir (or production plant) I connected to the delivery pipe M via a conduit L inserted in said pipe M downstream of compressor C along the direction of oxygen flow. The oxygen injected but undissolved or, anyhow, unconsumed goes back to gasometer G via a return pipe R. On said return pipe R, before the recovered oxygen reaches gasometer G, there is inserted a recycle oxygen purification unit comprising a known per se coalescence filter serially connected to a catalytic combustion chamber T also known per se. In this latter chamber, a controlled combustion in the presence of a suitable catalyst, of the combustible gases such as hydrogen sulphide, methane and the like, takes place, which form upon anaerobic decomposition of organic substances. In this way, the oxygen which is sent to compressor C permits a reliable operation of this latter. As needed, the combustion chamber can be substituted by an adsorption tower containing activated carbon or molecular sieves, or by a similar device.

With specific reference to FIG. 2, the injection device D substantially consists of a Venturi-shaped pipe 1. An inlet grating 2 and an outlet grating 2', respectively, are placed at the opposite ends of pipe 1. A nozzle 3 for injecting pressurized oxygen under turbulent flow conditions is sealingly welded to the frustoconical wall of pipe 1 whereat the pipe tapers so as to form the throttling zone 5. The upstream end 3a of the nozzle 3 is sealingly connected via a flanged pipe fitting 6 to the delivery pipe M for the pressurized oxygen, whilst the ejection throat 3b of the nozzle 3 is axially positioned in pipe 1, coming out at the throttling zone of the pipe 1. The pipe 1 is provided, in proximity to the outlet grating 2', with a bell-shaped collector 7 which, according to the embodiment shown in FIG. 2, has substantially frustoconical shape, the lower rim of the frustoconical wall being sealingly welded to the wall of pipe 1, wherein the fluid moves with laminar flow. The bell-shaped collector 7 is provided at its upper wall 7' with a passing-through hole in which is sealingly welded a flanged pipe fitting 8 which is in turn connected to the return pipe R for recycling oxygen to gasometer G.

In operation, the oxygen, after compression to a suitable pressure, flows through the delivery pipe M, passes into nozzle 3 and through the ejection throat 3b enters the pipe 1, into the throttling zone 5 thereof. The ejection of oxygen under pressure causes a pressure differential between the inlet grating 2 and the outlet grating 2' of pipe 1, which can cause or improve the continuous flow of water passing in the apparatus through the grating 2 (as shown by arrow F) and passing out grating 2' (as shown by arrow F'), the entering water being characterized by a high BOD (Biochemical Oxygen Demand) and being low in oxygen, whilst the water passing out the grating 2' is characterized by a high concentration of oxygen dissolved therein, which concentration is largerly dependent on the water temperature and the hydrostatic pressure acting at the level of device D. The oxygen bubbles which do not dissolve in the water flowing through the device D move upwardly, coalesce and are collected by the bell-shaped collector 7, and then pass from the collector 7 through the flanged pipe fitting 8 and the return pipe R to gasometer G from which oxygen can be recycled.

It is apparent that in the absence of the bell-shaped collector, the oxygen portion which does not dissolve in water and is not anyhow used up by the organic pollutants liable for the high BOD value of the water, would be unavoidably wasted, particularly on account of the fact that while flowing upwardly from the deep layers of the pool and reaching the zones close to the surface of the pool itself, the oxygen bubbles pass through water layers which are less low in oxygen on account of their increased possibility of gaseous exchange with the atmospheric oxygen. This bubbling could furthermore cause a harmful mixing of the limnological strata.

With specific reference to FIGS. 3 and 4 a further embodiment of the apparatus according to the present invention is now illustrated.

The upstream end of pipe 1 along the direction of water flow is connected via a flanged pipe fitting to a flexible tubing 10, the opposite end of which is linked to a mooring line 11 supported by a float 12. At the inlet end of flexible tubing 10 there is provided a filter 13 so as to avoid that foreign materials enter tubing 10. The filter 13 makes more efficient the action of grating 2. In some instances this latter can be eliminated.

The linking point of the end of flexible tubing 10 to the mooring line 11 can be varied so that the drawing of polluted water can be carried out at different zones and layers.

Also, this embodiment provides for a bell-shaped collector 7. However, whilst in the previous embodiment the bell-shaped collector was welded to the tubular wall of pipe 1, according to this second embodiment it is welded to the wall of the substantially cylindrical casing 14. The substantially cylindrical casing 14 constitutes a means for avoiding the dispersion of the injected and unconsumed oxygen. The bell-shaped collector 7 is provided, at the upper wall 7' thereof, as in the previous embodiment, with a passing-through hole in which a flanged pipe fitting 8 is sealingly welded, which pipe fitting is in turn connected to the return pipe R for the oxygen to be sent to gasometer G. Also the return pipe R, particularly as far as its submersed portion is concerned, can be realized with a flexible tubing.

The purified water leaves the substantially cylindrical casing 14 along the direction shown by arrow F'. As is particularly illustrated in FIG. 4, the purified water is passed into a flexible tubing 15 securely connected to the outlet end of the substantially cylindrical casing 14.

The purified water leaves the flexible tubing 15 through a divergent nozzle 16 having the smaller end fixed to the flexible tubing 15. The nozzle 16 is prismatically shaped having a triangular base, and a grating 2' is placed on the outlet orifice 16a for the purified water.

The outlet orifice 16a which has preferably width larger than its height is kept as parallel as possible to the pool bottom so that the purified water flow leaving the nozzle 16 does not cause modification of the pool stratification which would bring about layer mixing. It is thus possible to carry out water purification separately in the hypolimnion (low anoxic zone) and/or in the metalimnion (intermediate zone) or even in the epilimnion (upper zone high in oxygen), the purification action carried out in a first layer bringing about no disturbances in the adjacent layer.

With specific reference to FIG. 4, the nozzle 16 from which the water high in oxygen goes out, is sustained by a mooring line 17 supported by a float 18. Consequently, also the position of nozzle 16 can be varied to become adequate to the position of the inlet of flexible tubing 10. Indeed, in order not to cause any perturbation in the limnologic layers, the inlet of flexible tubing 10, the injection device D and the nozzle 16 can be aligned according to a substantially horizontal line. In this way, as before specified, the water flow is substantially horizontal and parallel to the layers of the pool to be purified. However, the provision of sucking and delivery flexible tubings permits to act on different layers and at various pool zones, as required.

With specific reference to FIGS. 4 and 5, the apparatus according to the present invention comprises, placed between the oxygen injector D and collector 7 for the unconsumed oxygen, a device f suitable for maintaining the mixture oxygen-water under turbulent flow conditions over a determined and calculable time period.

The device f for the forced mixing comprises a pump 21 arranged in a pipe 19 secured through a connector 20 to the pipe 1, preferably an axial-piston pump; downstream of the axial-piston pump 21, along the direction of the water flow, there is provided a labyrinth chamber 22 which is crossed by water and oxygen under turbulent flow conditions, thus making more effective mixing thereof in comparison with the mixing achieved by the injection device shown in FIG. 2.

The labyrinth chamber 22, shown in detail in FIG. 5, comprises, besides said tubing 19, a second tubing 23 securely fixed to the first tubing 19 and having its end 23a sealingly closed by a cap so that the water and oxygen stream is diverted into the zone located between the outer wall of tubing 19 and the inner wall of the second tubing 23. The water and oxygen flow is further diverted in the zone comprised between the outer wall of the tubing 23 and the inner wall of the substantially cylindrical casing 14, insofar as this latter is sealingly secured with its wall 24 on tubing 19. This cycle can be repeated several times as needed, and the labyrinth chamber can have a vertical or inclined axis, instead of having a horizontal axis.

In the foregoing zones for the flowing of the water-oxygen mixture there can be provided a plurality of stationary blades 25 suitable for increasing the mixing effectiveness.

The embodiment described above and illustrated in the annexed figures, provides that the pump 21 shall be an axial pump and that the labyrinth chamber 22 shall be placed downstream of the pump 21. This embodiment, which is preferred on account of the high obtainable efficiency, is not however a limiting embodiment, insofar as there might be provided a different pump type, whilst the labyrinth chamber 22 could be located upward of pump 21.

With specific reference to FIG. 4, on the return pipe R for the recycle oxygen there is inserted a drop separator device U for separating the recovered oxygen.

Figure 7:
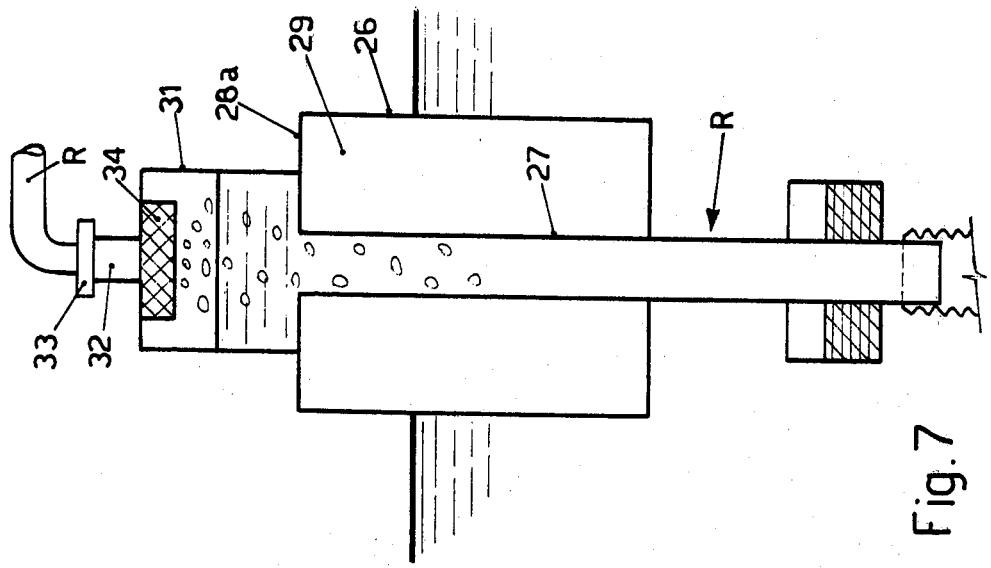
FIG. 7 shows a second embodiment of said drop trap.
Figure 6:
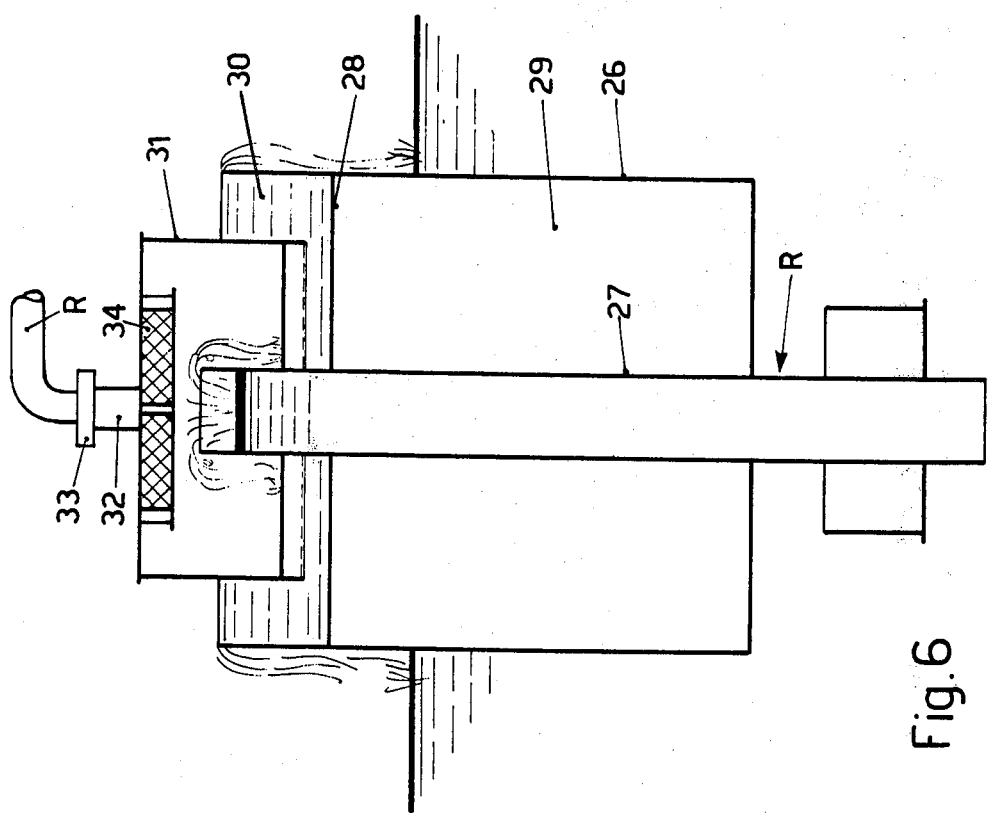
FIG. 6 shows a first embodiment of the trap for separating water drops from the recovered oxygen.

The drop separator U is shown in detail in FIGS. 6 and 7 illustrating two embodiments thereof.

With specific reference to FIG. 6, the separator device U, according to the first embodiment, comprises a float 26 for instance a cylindrically shaped float in which there is inserted the end 27 of the immersed portion of pipe R.

The float 26 is internally provided, in correspondence of its emerged portion, with a wall 28 delimiting on one side the float chamber 29 and on the other side a collection chamber 30, having an aperture at the top thereof, in which falls the water passing out of the end 27 of the return pipe R.

Within the collection chamber 30, there is inserted, partially projecting therefrom, a cover 31, for instance having cylindrical shape as the float 26, but of smaller diameter with respect to this latter. The cover 31 is provided at its upper portion with a pipe 32 connected via a connector 33 to the emersed portion of the return pipe R. The overall structure forms a hydraulic guide which permits the oxygen to flow earthward and the water high in oxygen to fall down into the pool. At the inlet end of the pipe 32 there is provided a coalescence filter 34 or similar filter, suitable to permit passage of oxygen into the pipe 32, simultaneously preventing passage of water which falls down into the collection chamber 30. In this way, the recycle oxygen which is sent to the gasometer G entrains an extremely limited amount of droplets, the last of which are eliminated by the separator S (FIG. 1). The purpose of separator S is to eliminate the condensate drops, if any, which can form in the emersed portion of the return pipe R.

The modified embodiment of the separator device U is herebelow described with reference to FIG. 7.

This embodiment of the separator device U is substantially identical to that of FIG. 6 and consequently like elements are designated by the same reference numbers.

The only difference is that according to this alternative embodiment, there is not provided the collection chamber 30 and consequently the chamber delimited by the cover 31 is closed. In fact, the cover 31 is sealingly fixed to the upper wall 28a of the float 26.

Consequently, in this case the separator device permits operation at higher pressure without, however, discharging the water high in oxygen into the pool.

There are apparent the remarkable advantages deriving from the apparatus and process for purifying polluted waters contained in natural or artificial pools according to the present invention. Among these advantages, the following can be for instance specifically mentioned:

(a) It is possible to increase the oxygen concentration up to saturation conditions, just at the level of those deep layers of natural or artificial pools which can not be involved by the gaseous exchange phenomena with atmospheric oxygen, which are peculiar to the superficial layers of the pools themselves;

(b) It is consequently possible to lower or even reduce to zero the BOD of the deep pool layers, thus reversing the prevaleence of the anaerobic metabolic processes over the aerobic ones;

(c) It is possible to obtain dissolution efficiency far superior with respect to the prior art systems providing for the natural bubbling of oxygen, insofar as the mass transfer coefficient in liquid phase is under turbulent flow conditions up to 100,000 times higher than that under laminar low condition (A.A. Kalinske and C.L., Pien, Industrial Engineering Chem. 36, pag. 220-1944);

(d) It is possible to achieve power consumptions more than five times lower than that of similar known pressurized air devices;

(e) It is possible to use up completely the oxygen delivered to and recycled in the process;

(f) It is possible to achieve high oxygen concentration just in those layers where oxygen is particularly needed, on the account of the enhanced oxygen solubility as function of the increased pressure and lower temperatures with respect to the pressure and temperatures values characteristics of the upper pool layers;

(g) It is possible to have throughout the pool substantially the same oxygen content this content being substantially the same as that of the upper pool layers, because the water high in oxygen is uniformly spread by the natural streams.

It is also to be emphasized that through the collector device for recovering undissolved oxygen it is possible to bring the water mass of a natural pool to saturation value having available an oxygen production unit of limited capacity.

Supposing for instance to restore to its normal environmental conditions a lake having capacity of 10 millions m$^3$ by bringing its oxygen content up to 10 mg/l (which is a sufficient value for the growth of water plant and animal organisms) it would be sufficient to deliver 70.000 Nm$^3$ of oxygen, corresponding to an hourly flow rate of about 145 Nm$^3$/h of oxygen over a 20-day period, which is the output capacity of an air fractionation plant of limited dimensions. A further advantage afforded by the present invention is that it is possible to use a part of the energy necessary for water pumping in order to maintain at contact air and oxygen under turbulent stream conditions over a sufficient time to dissolve most of the gas bubbles.

What is claimed is:

1. An apparatus for oxygenating polluted water contained in natural or artificial bodies of water exposed at the surface thereof to the atmosphere, comprising:
   (a) pipe means, placeable at the bottom of the body of water, for permitting passage therethrough of water in the body of water, said pipe means comprising a horizontally disposed, longitudinally extended, axially open, substantially tubular pipe having a Venturi-shaped throat therein;
   (b) injection means for injecting pressurized oxygen into said pipe means in a manner such that the water is caused to flow through said pipe means, said injecting means including a nozzle, the injection throat of which being directed axially, in a downstream direction, at the throttling zone of the Venturi-shaped throat of said pipe; and
   (c) an oxygen collection means for collecting undissolved oxygen before it is expelled from said pipe means, comprising an oxygen collecting chamber fixedly secured to said pipe means at a distance downstream of the point of oxygen introduction by said injection means.

2. An apparatus in accordance with claim 1 further including a removal means connected to said oxygen collecting chamber for removal of the undissolved oxygen collected therein from said chamber and from the body of water without substantially disturbing the natural limnological strata thereof.

3. An apparatus in accordance with claim 2, wherein said removal means includes a tube connected at one end to said oxygen collecting chamber and a floating separator means connected to the other end of said tube, said floating separator means comprising a float chamber designed to float at the surface of the body of water, and a separation chamber connected to said floating chamber in which the undissolved oxygen may rise above the surface level of the water therein.

4. An apparatus in accordance with claim 3, wherein said removal means further includes return pipe means, connected to the upper portion of said separation chamber, for returning the collected undissolved oxygen to said injection means.

5. An apparatus in accordance with claim 1, further including forced mixing means for causing forced mixing of the oxygen with the water under turbulent flow conditions, disposed in said pipe means between said injection means and said oxygen collecting means.

6. An apparatus in accordance with claim 5 wherein said forced mixing means includes a mixing pump and a labyrinth chamber, in operative combination.

7. An apparatus in accordance with claim 6 wherein said labyrinth chamber is provided with fixed blades along the flow path thereof for increasing the mixing effectiveness.

8. An apparatus in accordance with claim 1, further including a first flexible tube connected to the inlet of said pipe means, and inlet depth adjusting means, connected to the end of said first tube opposite that end connected to said pipe means, for adjustably fixing the depth of said end within the body of water, whereby the effective depth of the inlet of the apparatus may be set at any depth of the body of water while the operative equipment rests on the bottom.

9. An apparatus in accordance with claim 8 further including a second flexible tube connected to the outlet of said pipe means, and outlet depth adjusting means, connected to the end of said second tube opposite that end connected to said pipe means, for adjustably fixing the depth of said end within the body of water, whereby the effective depth of the outlet of the apparatus may be set to be the same as that of the inlet.

10. An apparatus in accordance with claim 1 further including an outlet throat connected to the downstream end of said pipe means, said throat having a horizontal width far larger than the vertical height thereof, whereby the flow of outlet water is substantially parallel to the limnological strata of the body of water.

11. A method of oxygenating polluted water contained in natural or artificial bodies of water exposed at the surface thereof to the atmosphere, using the apparatus of claim 1, comprising:
    submerging said pipe means to the bottom of the body of water;
    injecting oxygen by means of said injection means; and
    collecting undissolved oxygen before it is expelled from said pipe means, by means of said oxygen collection means.

* * * * *